United States Patent [19]
Yeakley

[11] 3,766,831
[45] Oct. 23, 1973

[54] COMPOUND AXIAL TORSIONAL HYDRAULIC ACTUATOR

[75] Inventor: Lester M. Yeakley, San Antonio, Tex.

[73] Assignee: Southwest Research Institute, San Antonio, Tex.

[22] Filed: Dec. 9, 1971

[21] Appl. No.: 206,264

[52] U.S. Cl.............................. 92/2, 91/61, 92/116, 92/122
[51] Int. Cl............................................. F01b 21/00
[58] Field of Search .................... 92/2, 65, 116, 120, 92/121, 122; 91/61

[56] References Cited
UNITED STATES PATENTS

| | | | |
|---|---|---|---|
| 1,846,817 | 2/1932 | Smith, Jr. | 91/61 X |
| 2,359,819 | 10/1944 | Bachrach | 92/122 X |
| 2,893,210 | 7/1959 | Muszynski | 92/65 X |
| 3,032,020 | 5/1962 | Sneen | 92/122 X |
| 3,171,332 | 3/1965 | Randle | 92/122 X |
| 3,620,132 | 11/1971 | Nitkiewicz | 92/2 |

OTHER PUBLICATIONS
Lindholm, Yeakley, Nagy: "Development of a High Speed Biaxial Testing Machine," July 1971.

*Primary Examiner*—Martin P. Schwadron
*Assistant Examiner*—Abe Hershkovitz
*Attorney*—James F. Weiler et al.

[57] ABSTRACT

A compound axial torsional hydraulic actuator for use in supplying both linear and rotational motion to a single shaft. Only two moving parts are utilized, an axial actuator rod and a torsional transfer ring. All forces are transmitted to the actuator rod hydraulically and within a single cylinder. Movement in each mode is independent.

5 Claims, 4 Drawing Figures

PATENTED OCT 23 1973

Lester M. Yeakley
INVENTOR.

BY *Paul L. DeVerter II*

ATTORNEYS

Lester M. Yeakley
INVENTOR.

BY

ATTORNEYS 3,766,831

COMPOUND AXIAL TORSIONAL HYDRAULIC ACTUATOR

BACKGROUND OF THE INVENTION

The present invention relates to a compound axial torsional hydraulic actuator, and more particularly to a hydraulic actuator which is capable of providing both linear and rotational motion through a single output shaft, both concurrently and independently. Only two moving parts are utilized, and all forces are applied to a single shaft through hydraulic pressure.

Prior hydraulic actuators have generally included mechanical couplings between the linear or axial actuator and the torsional or rotary actuator, such as by means of a splined shaft. Although the ultimate movement produced by such a device illustrated in the patent to Muszynski, U. S. Pat. No. 2,893,210, is very similar to that produced by the instant invention, the means for achieving the results are substantially different. The use of a spline type mechanical coupling requires the use of operational clearance, which results in backlash, and is inherently subject to a high frictional loading which limits the accuracy of the applied load and leads to rapid wear of the mechanical components.

SUMMARY

The compound axial torsional hydraulic actuator of the present invention generally includes a linear cylinder having an axial actuator rod slidably and rotatably mounted therein. Torsional or rotational movement is imparted to the rod by means of an elongate torque plate which is encircled by a torsional transfer ring with one or more vanes extending radially therefrom. Corresponding vanes are situated within the cylinder. The transfer ring incorporates torsional pistons which act hydraulically against the torque plate portion of the axial actuator rod to impart torsional movement thereto. Mounted on either end of the torque plate are linear pistons to which hydraulic fluid is directed for linear or axial movement of the actuator rod.

The actuator of the present invention is well adapted for use in providing both torsional and axial loading at varying cycles and forces, each mode being independent of the other, to test specimens in a material testing machine. It is equally well adapted to providing both axial and torsional motions in positioning mechanisms, heavy equipment, and machining equipment. The present actuator effectively eliminates backlash during load reversal, and provides positive control at all positions. This is accomplished by applying all forces to a single shaft through hydraulic pressure, thus eliminating the error existing in typical mechanically coupled or conventionally splined systems. Additionally, the present invention is both small and compact, with only two moving parts. Each mode of loading is independent and programmable by closed loop control. Variations of loading, frequency, displacement, pressures and the like for each mode are entirely independent of the other mode during operation. High speed operation of the actuator is limited solely by the ability to supply hydraulic actuating fluid at the desired speed, as by servo valves, and not by mechanical or hydraulic restrictions of the present invention.

Thus, it is a particular object of the present invention to provide a compound axial torsional hydraulic actuator in which backlash is eliminated and positive control is provided at all times, while attaining the other objects and advantages mentioned above.

Other and further objects, features and advantages will be apparent from an examination of the following description of the presently preferred embodiments of the invention, given for the purpose of disclosure, when taken in conjunction with the accompanying drawings.

BRIEF DESCRIPTION OF THE DRAWINGS

Like character references designate like parts throughout the several views of the drawings.

DESCRIPTION OF THE PREFERRED EMBODIMENT

Figure 1:
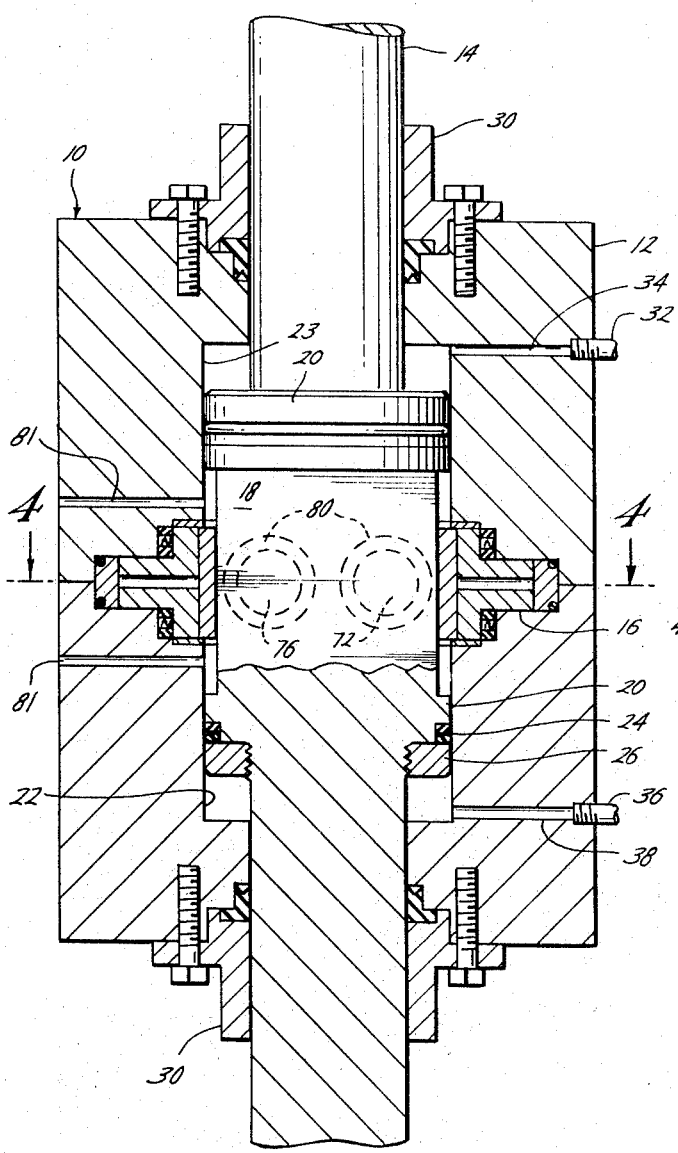
FIG. 1 is a partial sectional side view of the present invention.
Figure 3:
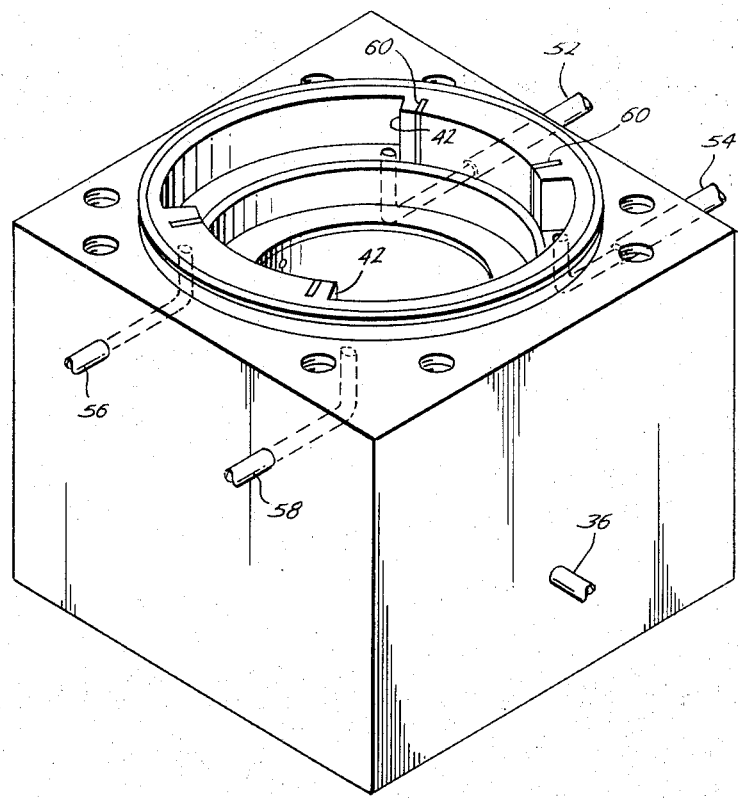
FIG. 3 is a perspective view of the cylinder when split along the line 4—4 of FIG. 1 and looking interiorly thereof.

Referring now to FIG. 1, the reference numeral 10 generally designates the compound axial torsional hydraulic actuator of the present invention which includes a case 12, an axial actuator rod 14, and a floating torque transfer ring 16 mounted, in a manner to be hereinafter described, about the actuator rod 14. The actuator rod 14 and the transfer ring 16 comprise the only two moving parts, and the remainder of the parts to be described consist primarily of fluid seals, fluid passageways, and fastening elements. For ease of construction, the case 12 is split transverse its axis, along the line 4—4 into two symmetrical halves, and one of these halves is illustrated in FIG. 3.

Figure 2:
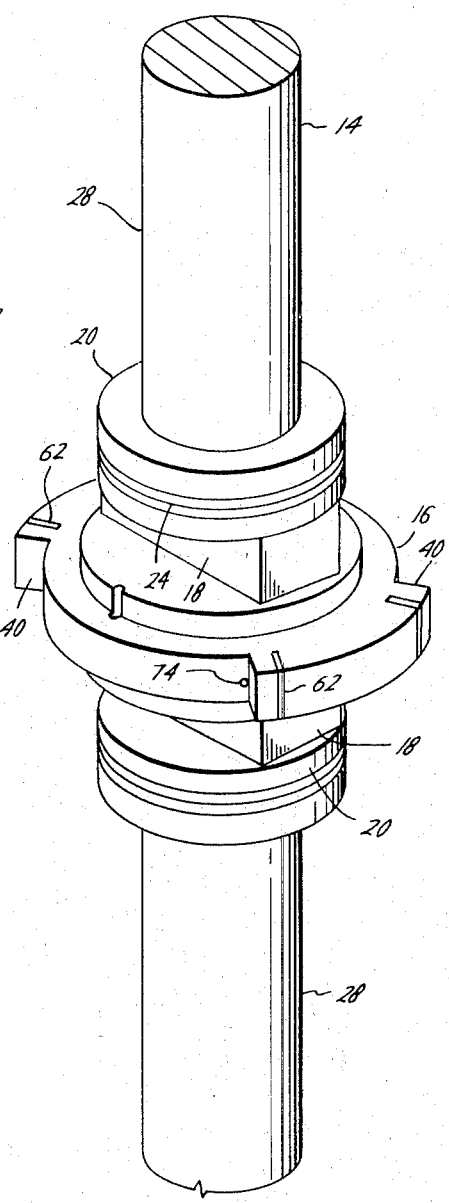
FIG. 2 is a partial perspective view of the axial actuator rod with the transfer ring mounted thereon.
Figure 2:
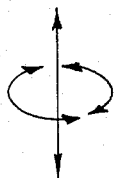
Figure 4:
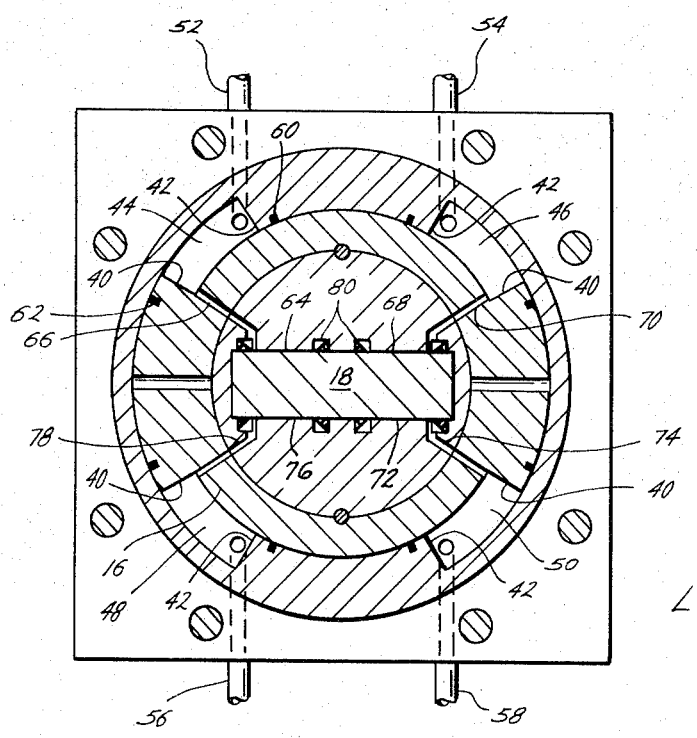
FIG. 4 is a sectional view, taken along the line 4—4 of FIG. 1.

Comparing FIGS. 1 and 2, the axial actuator rod 14 includes an elongate torque plate 18 intermediate the ends thereof. The torque plate is generally rectangular in cross-section, as illustrated in FIG. 4. At either end of the torque plate 18 are situated linear pistons 20. The pistons 20 are adapted to slide axially in the linear cylinders 22 and 23 formed in the case 12. Associated with each piston 20 is appropriate piston packing 24, and for renewal of the packing, the pistons may include a removable portion 26. Extending from each piston 20 is an appropriate piston rod 28 which extends through an appropriate packing gland 30 at either end of the case 12. A hydraulic fluid conduit 32 and associated port 34 lead to the linear cylinder 23, while a corresponding conduit 36 and port 38 lead to the opposite linear cylinder 22.

The axial actuator rod comprises a single machined member incorporating the torque plate 18 and both pistons 20, as well as the piston rods 28. Interconnections to the axial actuator rod 14 may be made to other machine elements in any conventional manner.

The floating torque transfer ring 16 is slidably mounted on the torque plate 18, in such a manner that it may slide along between the pistons 20. The transfer ring 16 not only encircles the torque plate 18 but is coaxially mounted therewith, as illustrated in FIGS. 2 and 4. Extending radially outwardly from, yet forming a part of, the transfer ring, are rotating or movable vanes 40, which are symmetrically attached on opposite sides of the transfer ring 16. Extending radially inwardly from the case 12 are fixed vanes 42. The fixed vanes are mounted in the case 12 intermediate the ends of the linear cylinders 22 and 23. The volumes between the movable vanes and fixed vanes bounded by the case 12 and transfer ring 16 form four torsional chambers, designated as chambers 44, 46, 48 and 50. Hydraulic fluid conduit 52 leads to chamber 44, conduit 54 leads to chamber 46, conduit 56 leads to chamber 48, and conduit 58 leads to chamber 50. Located between the transfer ring 16 and the fixed vanes 42 are appropriate fluid seals 60, and located between the movable vanes 40 and the case 12 are additional fluid seals 62.

Inside the transfer ring 16 adjacent the torque plate 18 are four floating torsional pistons. Each piston is strictly a hydraulic piston and has no mechanical moving parts. Torsional piston 64 communicates with chamber 44 through passageway 66, piston 68 with chamber 46 through passageway 70, piston 72 with chamber 50 through passageway 74 and piston 76 with chamber 48 through passageway 78. Torsional piston seals 80 surround each of the pistons 64, 68, 72 and 76, and are illustrated both in FIGS. 4 and 1 (in section). Hydraulic pressure introduced through conduit 52 into torsional chamber 44 exerts its rotational reaction forces against fixed vane 42 and through torsional piston 64 against the torque plate 18. These forces will, when referring to FIG. 4, result in a torque being applied to the torque plate 18 in a counter-clockwise direction as will introduction of hydraulic pressure through conduit 58 into torsional chamber 50 and torsional piston 72. Conduits 52 and 58 are joined together (either externally or through appropriate internal ports) so that equal pressure is introduced into chambers 44 and 50 and therefore applied to pistons 64 and 72. This pressure will, in chambers 44 and 50, result in a counter-clockwise torque on the torque transfer ring 16 which torque is equal to twice the product of the cross-sectional area of the rotating vanes 40, their effective radius from the central axis of the actuator rod, and the applied pressure. This pressure will also be transferred through ports 66 and 74 to pistons 64 and 72, and result in a clockwise torque on the torque transfer ring 16 which is equal to twice the product of cross-sectional area of the pistons 64 and 72, their moment arm about the axis of the actuator rod and the applied pressure. The resultant torque on the torque transfer ring 16, due to pressure introduced into conduits 52 and 58, is made to be zero by designing for the product of the cross-sectional area of the rotating vanes 40 and their effective radius to be equal to the product of the cross-sectional area of the pistons, 64 and 72, and their torsional moment arm. In the same manner conduits 54 and 56 are connected together and pressure introduced into chambers 46 and 48 and torsional pistons 68 and 76 will produce a clockwise torque on the torque plate 18 and zero torque on the torque transfer ring 16. The resultant torque on the torque plate 18, and thus on the actuator rod 14, is proportional to the differential pressure between the conduits 52-58 and 54-56.

Thus it is seen that the torque transfer ring 16 is hydraulically floating and serves, not as a mechanical element, but as a means to transfer the hydraulic force to the torsional pistons, while eliminating friction, wear and backlash. The floating torque transfer ring 16 is free to follow the rotational motion of the torque plate 18 until the rotating vanes 40 interact with the fixed vanes 42 and thus limit the motion of the torque transfer ring 16, and thus the torque plate 18 and the actuator rod 14.

As regards linear or axial motion of the actuator rod 14, the limit of such motion is set by the distance that the transfer ring 16 can travel along the torque plate 18. Introduction of hydraulic fluid through conduit 32 and port 34 into cylinder 23 results in movement of the actuator rod away from port 34, while the opposite reaction results upon the introduction of fluid through port 38. Introduction of pressure through both ports will result in movement of the actuator rod in the direction of the lower of the two pressures. Note, however, that introduction of pressure through port 34 or 38 does not affect the rotational movement of the actuator rod 14, which is only accomplished by introduction of hydraulic fluid through the conduits 52-58 or 54-56. Similarly, the introduction of hydraulic fluid for rotational purposes does not effect axial movement of the actuator rod. Should any seepage occur past the piston seals (whether linear or torsional) into the center of the case 12, it may be eliminated through the seepage ports 81, illustrated in FIG. 1.

It should again be emphasized that all forces acting upon the actuator rod 14 are applied by means of hydraulic pressure, and not mechanical interconnection. Differential pressure applied between chambers 44-50 and 46-48 produces a torque between the case 12 and the torque transfer ring 16 due to the action of the pressure on the fixed vanes 42 and rotating vanes 40. The same differential pressure applied between torsional pistons 64-72 and 68-76 produces a torque between the torque transfer ring 16 and the torque plate 18 due to the pressure in the torsion pistons 64, 72, 68, 76. The resultant torque on the torsional transfer ring 16 is zero and torque applied to the torque plate 18, and thus the actuator rod 14 is reacted by the fixed vanes 42, and thus the case 12, resulting in positive control and the elimination of backlash.

Thus it is seen that the present invention has provided a compound axial torsional hydraulic actuator which is particularly useful in providing positive control over the actuator rod while eliminating backlash. The present invention, therefore, is well adapted to carry out the objects and attain the ends mentioned, as well as those inherent therein. While presently preferred embodiments of the invention have been given for the purpose of disclosure, numerous changes in the details of construction, and the combination, shape, size and arrangement of parts may be resorted to without departing from the spirit and scope of the invention as hereinafter claimed.

What is claimed is:

1. A compound axial torsional hydraulic actuator capable of supplying both linear and torsional outputs independently, including:
   a casing,
   a linear cylinder within the casing along an axis thereof,
   an axial actuator rod supported within the casing along the axis of the cylinder,
   an elongate torque plate intermediate the ends of the actuator rod,
   linear pistons adjacent each end of the torque plate and slidably mounted within the linear cylinder,
   a floating torque transfer ring mounted coaxially with the actuator rod and slidably encircling the torque plate, at least one moving vane extending radially outwardly from the transfer ring,
at least one fixed vane extending radially inwardly from the casing, intermediate the ends of the linear cylinder, whereby said vanes, case and transfer ring constitute a torsional actuator,
floating torsional pistons within the transfer ring arranged to act upon the torque plate,
said torsional pistons being radially spaced from the longitudinal axis of the torque plate,
port means establishing hydraulic communication for linear movement with each linear piston,
port means for establishing hydraulic communication with each side of the fixed vane within the torsional actuator, and
passageways extending from each side of the moving vane to the floating torsional pistons whereby hydraulic force applied against the fixed vane is reacted against hydraulic force transferred through the transfer ring to the torsional piston.

2. The invention of claim 1 including:
two moving vanes extending radially outwardly from the transfer ring and arranged symmetrically thereon,
two fixed vanes extending radially inwardly from the casing, intermediate the ends of the linear cylinder, and arranged symmetrically therein,
four floating torsional pistons within the transfer ring, said pistons being arranged symmetrically about the torque plate.

3. The invention of claim 2 wherein the product of the effective area of the fixed vane times its radius from the axis of the actuator rod is equal to the product of the area of the torsional piston times its radius from the axis of the actuator rod, thereby providing balanced torque forces within the torsional actuator.

4. The invention of claim 3 wherein the torque plate is generally rectangular in cross-section.

5. The invention of claim 1 including:
seal means associated with each floating torsional piston with each linear piston, with each moving vane, and with each fixed vane.

* * * * *